United States Patent
Hong et al.

(10) Patent No.: US 8,810,894 B2
(45) Date of Patent: Aug. 19, 2014

(54) ELECTROPHORETIC DISPLAY DEVICE

(75) Inventors: Seok-Joon Hong, Seongnam-si (KR);
Yujin Kim, Yongin-si (KR); Joo-Han Bae, Seongnam-si (KR); Hyung-Il Jeon, Incheon (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 193 days.

(21) Appl. No.: 13/356,212

(22) Filed: Jan. 23, 2012

(65) Prior Publication Data

US 2013/0033740 A1  Feb. 7, 2013

(30) Foreign Application Priority Data

Aug. 1, 2011 (KR) .......................... 10-2011-0076734

(51) Int. Cl.
*G02B 26/00* (2006.01)
(52) U.S. Cl.
USPC .......................................................... 359/296
(58) Field of Classification Search
USPC .......................................... 359/296; 345/107
See application file for complete search history.

(56) References Cited

U.S. PATENT DOCUMENTS

| | | | |
|---|---|---|---|
| 7,365,732 B2 | 4/2008 | Matsuda et al. | |
| 7,580,181 B2 | 8/2009 | Ohshima et al. | |
| 7,649,675 B2 * | 1/2010 | Chopra et al. | 359/296 |
| 7,772,339 B2 * | 8/2010 | Minami | 526/204 |
| 8,089,687 B2 * | 1/2012 | Mabeck et al. | 359/296 |
| 8,130,441 B2 * | 3/2012 | Frazier et al. | 359/296 |
| 8,427,735 B2 * | 4/2013 | Yamamoto | 359/296 |

FOREIGN PATENT DOCUMENTS

JP  2009-020279  1/2009

OTHER PUBLICATIONS

English Abstract for Publication No. 2009-020279.

\* cited by examiner

*Primary Examiner* — Tuyen Tra
(74) *Attorney, Agent, or Firm* — F. Chau & Associates, LLC

(57) ABSTRACT

An electrophoretic display device is provided. The device includes an array substrate including a plurality of pixels, an opposite substrate facing the array substrate, and an electrophoretic layer provided between the array substrate and the opposite substrate. The electrophoretic layer includes a non-polar solvent and at least two types of polar particles dispersed in the non-polar solvent that display different colors from each other. One of the array substrate and the opposite substrate includes a plurality of capturing holes configured to capture the polar particles when an electric field is applied between the array substrate and the opposite substrate.

19 Claims, 4 Drawing Sheets

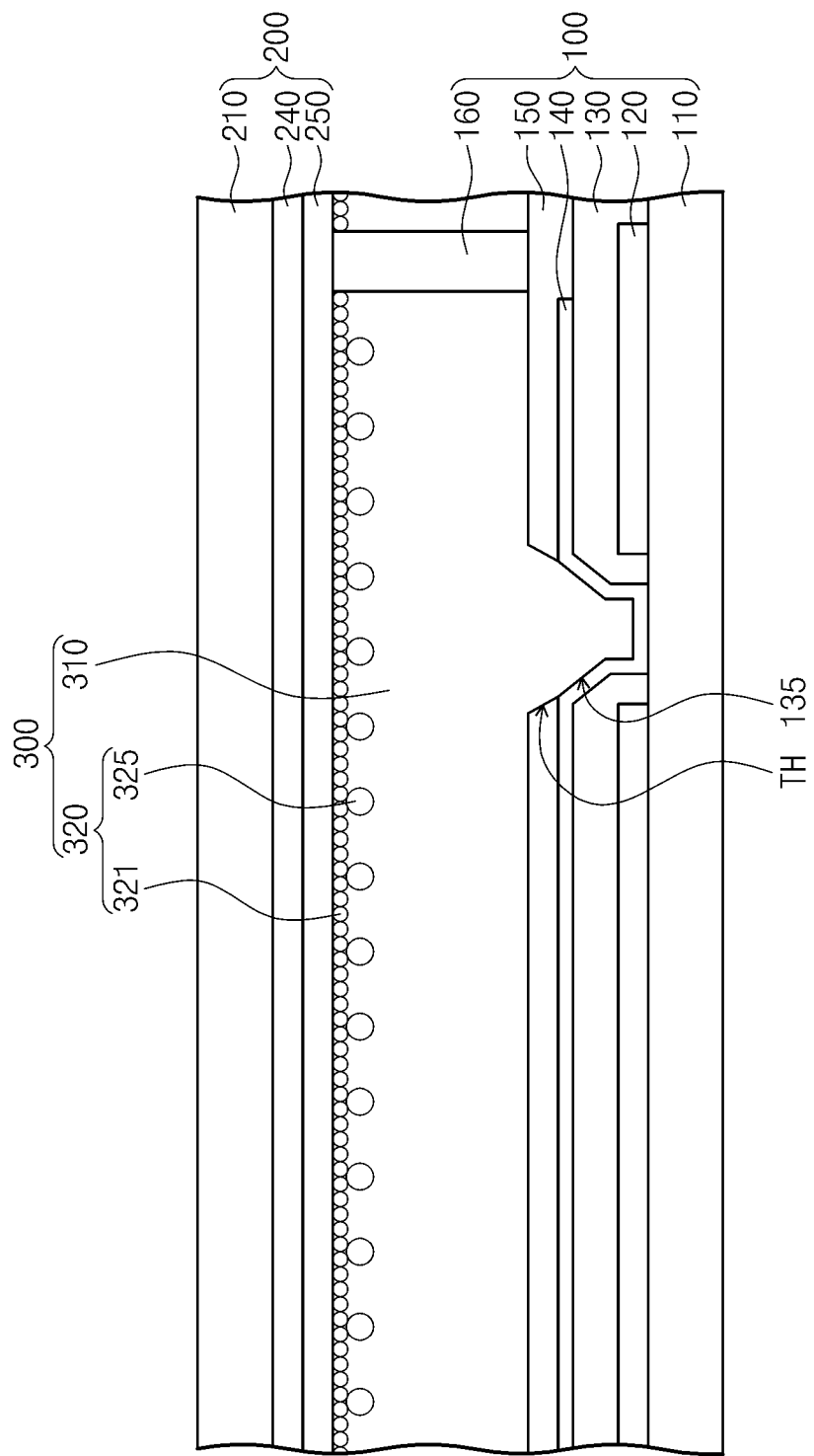

ELECTROPHORETIC DISPLAY DEVICE

CROSS-REFERENCE TO RELATED APPLICATIONS

This U.S. non-provisional patent application claims priority under 35 U.S.C. §119 from Korean Patent Application No. 10-2011-0076734, filed on Aug. 1, 2011, in the Korean Intellectual Property Office, the contents of which are herein incorporated by reference in their entirety.

BACKGROUND

Embodiments of the inventive concepts are directed generally to an electrophoretic display device, and more particularly, to an electrophoretic display device with an improved display quality.

In general, a liquid crystal display displays an image using optical properties of liquid crystals. Liquid crystal displays are slim, light weight, and have low power consumption as compared with cathode ray tube displays. However, there are limits to reducing the thickness and weight since a liquid crystal display requires a backlight assembly to provide light to the liquid crystals.

In contrast, an electrophoretic display apparatus displays an image using an electrophoretic phenomenon in which charged pigment particles are moved by an electric field generated between upper and lower substrates. The electrophoretic display apparatus can be operated without any light source, because the electrophoretic display apparatus is a reflective display apparatus configured to display an image by absorbing or reflecting an externally incident light using the pigment particles. Accordingly, an electrophoretic display apparatus is also slim and light weight as compared with a liquid crystal display.

SUMMARY

Exemplary embodiments of the inventive concepts provide an electrophoretic display device with an improved reflection property and an improved display quality.

According to exemplary embodiments of the inventive concepts, an electrophoretic display device may include an array substrate including a plurality of pixels, an opposite substrate facing the array substrate, and an electrophoretic layer disposed between the array substrate and the opposite substrate. The electrophoretic layer includes a non-polar solvent and at least two types of polar particles dispersed in the non-polar solvent that display different colors. One of the array substrate and the opposite substrate includes a plurality of capturing holes configured to capture the polar particles when an electric field is applied.

In some embodiments, each of the first polar particles may have a diameter less than that of each of the second polar particles.

In some embodiments, each first polar particle has a weight less than that of each second polar particle.

In some embodiments, the array substrate may include a first base substrate, a pixel electrode disposed on the first base substrate, and an organic reflective layer disposed on the pixel electrode that exposes a portion of the pixel electrode to define the capturing holes, and the opposite substrate may include a second base substrate and a common electrode disposed on a surface of the second base substrate facing the first base substrate.

According to other exemplary embodiments of the inventive concepts, an electrophoretic display device may include an array substrate including a plurality of pixels, an opposite substrate facing the array substrate, and an electrophoretic layer disposed between the array substrate and the opposite substrate. The electrophoretic layer may include a non-polar solvent, a plurality of first polar particles that reflect a first color, and a plurality of second polar particles that reflect a second color and have a different electric-field-induced mobility from the first polar particles. The first and second polar particles may be dispersed in the non-polar solvent. One of the array substrate and the opposite substrate may include a plurality of capturing holes that are configured to capture the first and second polar particles when an electric field is applied.

According to other exemplary embodiments of the inventive concepts, an electrophoretic display device may include an array substrate including a plurality of pixels, an opposite substrate facing the array substrate, and an electrophoretic layer disposed between the array substrate and the opposite substrate. The electrophoretic layer includes a non-polar solvent and at least two types of polar particles dispersed therein that display different colors. A first type of polar particles may have a greater electric-field-induced mobility than a second type of second polar particles. When a first electric field is applied between the array substrate and the opposite substrate, the first type of polar particles may cover the opposite substrate so that a corresponding pixel of the electrophoretic display device may display black.

In some embodiments, one of the array substrate and the opposite substrate includes a plurality of capturing holes configured to capture the polar particles when a second electric field is applied.

In some embodiments, when the second electric field is applied, the first type of polar particles fill a lower portion of the capturing holes and the second type of polar particles fill an upper portion of the capturing holes not occupied by the first type of polar particles so that a corresponding pixel of the electrophoretic display device displays white.

BRIEF DESCRIPTION OF THE DRAWINGS

FIGS. 1 through 4 represent non-limiting, exemplary embodiments as described herein.

FIG. 1 is a perspective view of an electrophoretic display device according to exemplary embodiments of the inventive concepts.

FIG. 2 is a plan view illustrating how to arrange polar particle capturing holes in one pixel of the electrophoretic display device of FIG. 1.

FIGS. 3 and 4 are sectional views taken along a line of FIG. 2 and illustrate how to operate the electrophoretic display device of FIG. 1.

It should be noted that these figures are intended to illustrate the general characteristics of methods, structure and/or materials utilized in certain exemplary embodiments and to supplement the written description provided below. These drawings, however, should not be interpreted as defining or limiting the range of values or properties encompassed by exemplary embodiments. The use of similar or identical reference numbers in the various drawings is intended to indicate the presence of a similar or identical element or feature.

DETAILED DESCRIPTION

Hereinafter, exemplary embodiments of the inventive concept will be described in detail with reference to the accompanying drawings.

Figure 1:
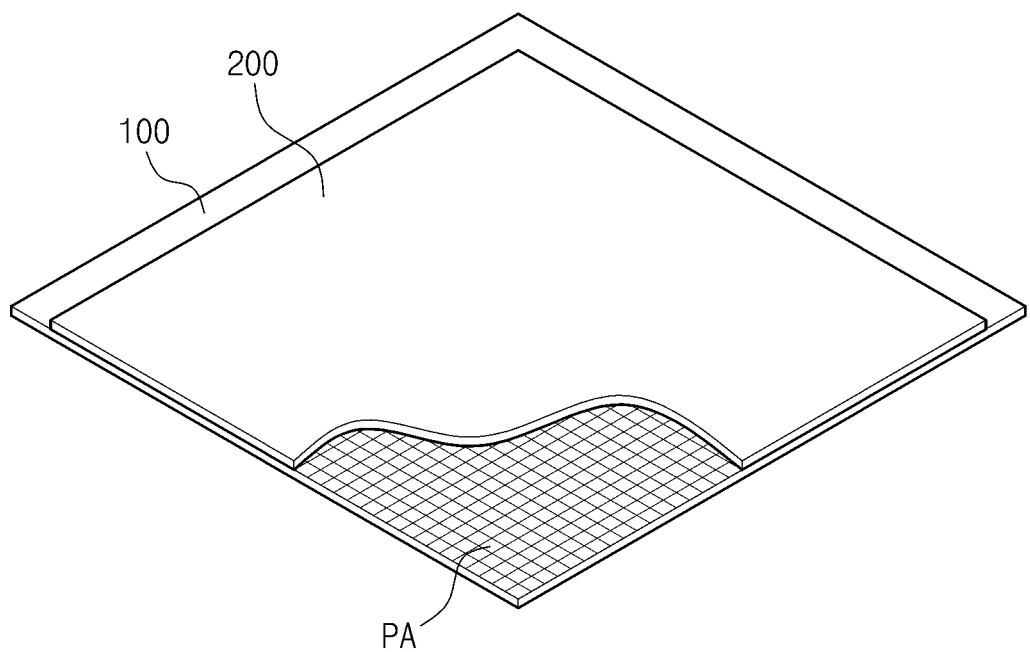
Figure 2:
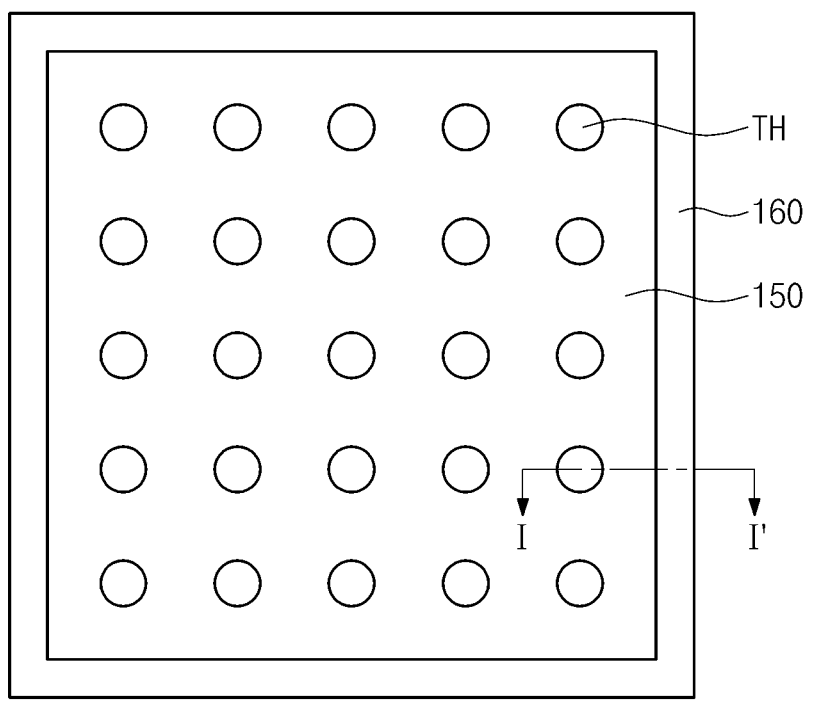
Figure 3:
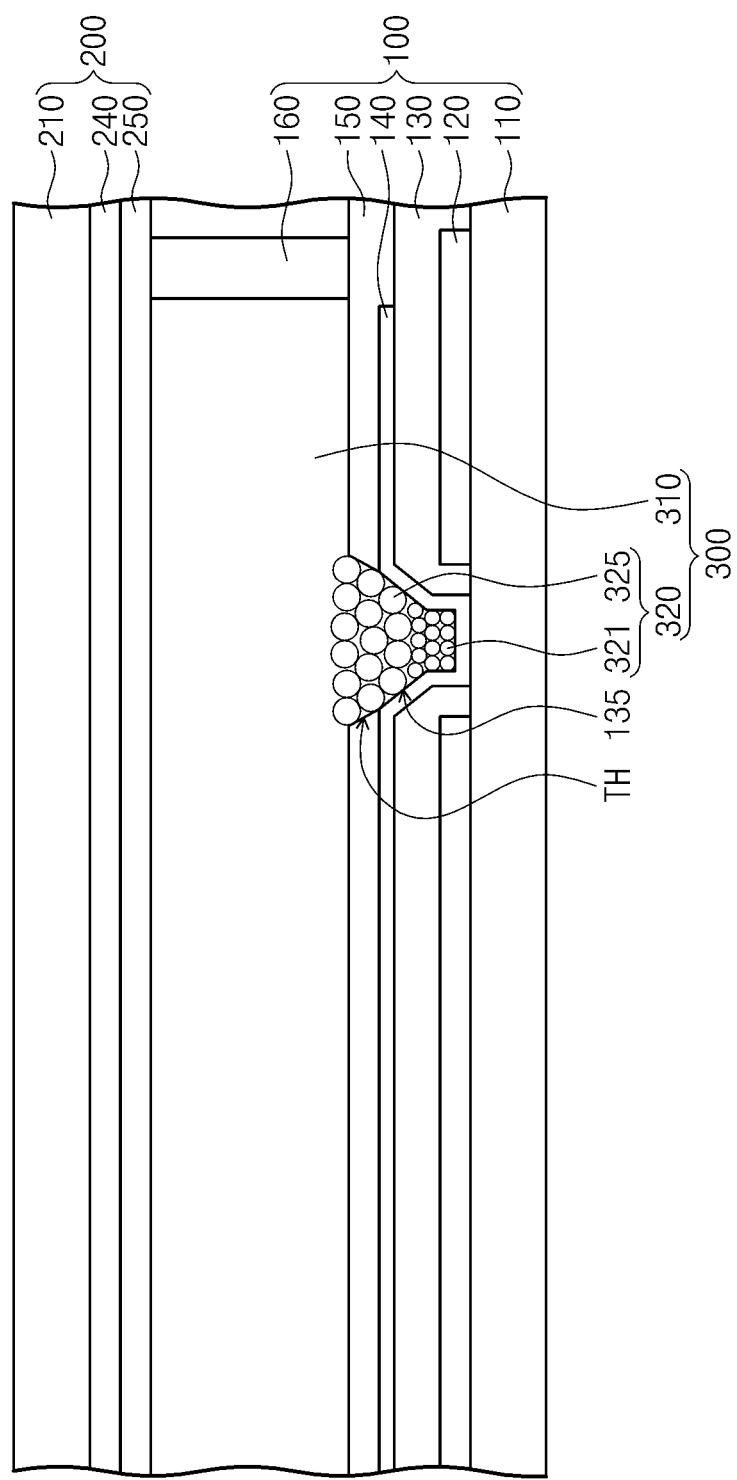

FIG. 1 is a perspective view of an electrophoretic display device according to exemplary embodiments of the inventive concepts. FIG. 2 is a plan view illustrating how to arrange polar particle capturing holes in one pixel of the electrophoretic display device of FIG. 1. FIGS. 3 and 4 are sectional views taken along a line I-I' of FIG. 2 and illustrate how to operate the electrophoretic display device of FIG. 1.

Referring to FIGS. 1 through 4, an electrophoretic display device may include an array substrate 100 including a plurality of pixels, an opposite substrate 200 facing the array substrate 100, and an electrophoretic layer 300 provided between the array substrate 100 and the opposite substrate 200. The electrophoretic layer 300 may include a non-polar solvent 310 and a plurality of polar particles 320 dispersed in the non-polar solvent 310.

The array substrate 100 may include a first base substrate 110 that includes a plurality of pixel areas PA, pixel electrodes 140 disposed in the pixel areas PA respectively, and an organic reflective layer 150 disposed on the pixel electrodes 140 to define polar particle capturing holes TH. Each polar particle capturing hole TH may be formed to expose a portion of a corresponding pixel electrode 140. In some embodiments, the polar particle capturing holes TH may be configured to capture the polar particles 320 The array substrate 100 may further include a partition wall 160. The partition wall 160 is disposed between the adjacent pixel regions PA. The partition wall 160 separates the electrophoretic layer 300 into a plurality of portions corresponding to the plurality of pixel regions PA, respectively. Thus, the partition wall 160 prevents the polarity particles 320 in the portion of the electrophoretic layer 300 provided to each of the pixel regions PA from moving into a neighboring pixel regions PA. As a result, the partition wall 160 prevents the polarity particles 320 from crowding in one pixel region PA.

The first base substrate 110 may include a display region (not shown) and a peripheral region (not shown) provided with peripheral circuits. The display region may be configured to include the pixel areas PA arranged in a matrix pattern. Each pixel area PA may be configured to include a gate line (not shown) extending along a first direction (e.g., parallel to one side of the array substrate 100) and a data line (not shown) extending along a second direction (e.g., perpendicular to the first direction). The data line may be electrically isolated from the gate line and disposed to cross the gate line. In each pixel area PA, there may be a thin film transistor (not shown) electrically connected to the gate line and the data line.

A metal reflective layer 120 may be provided on the first base substrate 110. The metal reflective layer 120 may be configured to reflect the externally incident light (hereinafter, 'external light') that is not reflected by the organic reflective layer 150. For example, the metal reflective layer 120 may include at least one metal.

An insulating layer 130 may be provided on the metal reflective layer 120 that exposes a portion of the first base substrate 110. In some embodiments, the insulating layer 130 may be formed with openings 135 exposing portions of the thin film transistors.

The pixel electrodes 140 may be provided on the insulating layer 130. The pixel electrodes 140 may be disposed on the respective pixel areas PA and cover the respective portions of the first base substrate 110 exposed by the openings 135. In other words, the pixel electrodes 140 may be electrically connected to the thin film transistors. The pixel electrode 140 may include a conductive transparent material, such as indium-tin-oxide (ITO).

The organic reflective layer 150 may be provided on the pixel electrode 140 to partially or completely reflect the external light. In some embodiments, the organic reflective layer 150 may include a material capable of reflecting white light, such as a white photoresist.

The organic reflective layer 150 may be configured to expose portions of the pixel electrode 140, defining the capturing holes TH, each of which can capture the polar particles 320. In some embodiments, the capturing holes TH may overlap with the openings 135 to make a space for capturing the polar particles 320. One or more capturing holes TH may be associated with each pixel.

The opposite substrate 200 may include a second base substrate 210 and a common electrode 240 facing the pixel electrode 140. A second insulating layer 250 may be provided on the common electrode 240. The partition wall 160 may be disposed between the second insulating layer 250 of the opposite substrate 200 and the organic reflective layer 150 of the array substrate 100.

The common electrode 240 may be applied with a common voltage. The common electrode 240 may include a conductive transparent material, such as indium-tin-oxide (ITO), such that external light incident from the second base substrate 210 can propagate into the electrophoretic layer 300.

As described above, the electrophoretic layer 300 may include a non-polar solvent 310 and a plurality of polar particles 320 dispersed in the non-polar solvent 310.

The non-polar solvent 310 may serve as a dispersion medium and, if necessary, contain at least one additive, such as a surfactant. In some embodiments, by virtue of the non-polar solvent 310, it is possible to prevent a gravity induced sedimentation of the polar particles 320 from occurring. This prevents the polar particles 320 from cohering in the pixel area PA.

The polar particles 320 may have the same polarity and include at least two types of polar particles that display different colors. For example, the polar particles 320 may include first polar particles 321 for displaying a first color and second polar particles 325 for displaying a second color. In some embodiments, the first polar particles 321 may include a material, such as carbon black, that reflects black, and the second polar particles 325 may include a material, such as titanium dioxide $TiO_2$, that reflects white.

In some embodiments, the first polar particles 321 may exhibit different electrical properties from the second polar particles 325, in particular a mobility induced by an external electric field. For example, the first polar particles 321 may have electric-field-induced mobility substantially greater than the second polar particles 325. This mobility difference can be exploited to improve a color gamut for white and black in each pixel of the electrophoretic display device. That is, this difference may improve a reflectance of the electrophoretic display device, when the first and second polar particles 321 and 325 are gathered in a capturing hole TH.

The first polar particles 321 may have a different diameter from the second polar particles 325. The aforementioned mobility difference can be achieved using this diameter difference between the first polar particles 321 and the second polar particles 325. For example, the second polar particles 325 may have diameters substantially greater than the first polar particles 321. In this case, the second polar particles 325 may have electric-field-induced mobility substantially less than the first polar particles 321.

For each pixel, a ratio of a total volume of the second polar particles 325 to a total volume of the first polar particles 321 may be substantially proportional or equivalent to a ratio of a total planar area of the capturing holes TH to a planar area of each pixel. In some embodiments, the ratio of a total volume of the second polar particles 325 to a total volume of the first polar particles 321, for each pixel, may be adjusted to be in the range of about 20% to about 25%.

The first polar particles 321 may have a different weight from that of the second polar particles 325. For example, each second polar particle 325 may have a greater weight than each first polar particle 321. In some embodiments, a ratio of a total weight of the second polar particles 325 to a total weight of the first polar particles 321, for each pixel, may be adjusted to be in the range of about 37% to about 46%.

Hereinafter, an operation of the afore-described electrophoretic display device will be described, with reference to FIGS. 3 and 4. For simplicity's sake, an exemplary, non-limiting embodiment of the electrophoretic display device in which both the first and second polar particles 321 and are positively charged will be described.

If a positive voltage is applied to the pixel electrode 140 and a negative voltage is applied to the common electrode 240, an electric field may be induced in the electrophoretic layer 300. Due to the presence of the electric field, the first polar particles 321 and the second polar particles 325 may start to move. Since the first polar particles 321 have a greater electric-field-induced mobility than the second polar particles 325, the first polar particles 321 may move toward the common electrode 240 more quickly than the second polar particles 325. As a result, the first polar particles 321 may cover the second insulating layer 250 disposed on the common electrode 340, and the second polar particles 325 may be disposed on the first polar particles 321, as illustrated in FIG. 4. As a result, the corresponding pixel of the electrophoretic display device displays black.

By contrast, if a negative voltage is applied to the pixel electrode 140 and a positive voltage is applied to the common electrode 240, an electric field may be induced in the electrophoretic layer 300. Due to the resulting electric field, both of the first and second polar particles 321 and 325 may be gathered in the capturing holes TH.

However, the first polar particles 321 may be gather in the capturing holes TH more quickly than the second polar particles 325, owing to the difference in mobility. As a result, the first polar particles 321 may fill a lower portion of the capturing hole TH and the second polar particles 325 may fill an upper portion of the capturing hole TH that is not occupied by the first polar particles 321, as illustrated in FIG. 3. As a result, the corresponding pixel of the electrophoretic display device displays white. According to exemplary embodiments of the inventive concepts, the organic reflective layer 150 may include a material capable of reflecting white light, such as a white photoresist, and the upper portion of the capturing hole TH may be filled with the second polar particles 325 formed a material, such as titanium dioxide $TiO_2$, that reflects white. In other words, even the portion of the pixel in which the capturing hole TH is formed can contribute to displaying white. As a result, an electrophoretic display device according to exemplary embodiments of the inventive concept can have an improved reflection and an improved display quality.

Moreover, referring back to the situation illustrated in FIG. 4, the second polar particles 325 do not affect the display of black since second polar particles 325 are disposed behind the first polar particles opposite from the second insulating layer 250 of the opposite substrate 200, due to the lower density and lower mobility of the second polar particles 325.

While exemplary embodiments of the inventive concepts have been particularly shown and described, it will be understood by one of ordinary skill in the art that variations in form and detail may be made therein without departing from the spirit and scope of the attached claims.

What is claimed is:

1. An electrophoretic display device, comprising:
an array substrate that includes a plurality of pixels;
an opposite substrate that faces the array substrate; and
an electrophoretic layer disposed between the array substrate and the opposite substrate, the electrophoretic layer including a non-polar solvent and at least two types of polar particles dispersed therein that display different colors,
wherein one of the array substrate and the opposite substrate includes a plurality of capturing holes, and each of the capturing holes is configured to capture the at least two types of polar particles when an electric field is applied between the array substrate and the opposite substrate.

2. The device of claim 1, wherein the polar particles comprise:
a plurality of first polar particles that reflect a first color; and
a plurality of second polar particle that reflect a second color.

3. The device of claim 2, wherein each first polar particle has a diameter less than a diameter of each second polar particle.

4. The device of claim 3, wherein a ratio of a total volume of the second polar particles to a total volume of the first polar particles, for each pixel, is substantially proportional to a ratio of a total planar area of the capturing holes defined within each pixel to a planar area of each pixel.

5. The device of claim 4, wherein the ratio of a total volume of the second polar particles to a total volume of the first polar particles, for each pixel, is in the range of about 20% to about 25%.

6. The device of claim 2, wherein each first polar particle has a weight less than a weight of each second polar particle.

7. The device of claim 6, wherein a ratio of a total weight of the second polar particles to a total weight of the first polar particles, for each pixel, is in the range of about 37% to about 46%.

8. The device of claim wherein the first polar particles are black and the second polar particles are white.

9. The device of claim 1, wherein the array substrate comprises a first base substrate, a pixel electrode disposed on the first base substrate, and an organic reflective layer disposed on the pixel electrode that exposes a portion of the pixel electrode to define the capturing holes, and
the opposite substrate comprises a second base substrate and a common electrode disposed on a surface of the second base substrate facing the first base substrate.

10. An electrophoretic display device, comprising:
an array substrate that includes a plurality of pixels;
an opposite substrate that faces the array substrate; and
an electrophoretic layer disposed between the array substrate and the opposite substrate, the electrophoretic layer including a non-polar solvent, a plurality of first polar particles that reflect a first color, and a plurality of second polar particles that reflect a second color and have a different electric-field-induced mobility from the first polar particles, the first and second polar particles being dispersed in the non-polar solvent,
wherein one of the array substrate and the opposite substrate includes a plurality of capturing holes, and each of the capturing holes is configured to capture the first and second polar particles when an electric field is applied between the array substrate and the opposite substrate.

11. The device of claim 10, wherein the first polar particles have a greater electric-field-induced mobility than the second polar particles.

12. The device of claim 11, wherein each of the first polar particles has a diameter less than a diameter of each of the second polar particles.

13. The device of claim 12, wherein a ratio of a total volume of the second polar particles to a total volume of the first polar particles, for each pixel, is proportional to a ratio of a total planar area of the capturing holes defined within each pixel to a planar area of each pixel.

14. The device of claim 13, wherein the ratio of a total volume of the second polar particles to a total volume of the first polar particles, for each pixel, is in the range of about 20% to about 25%.

15. The device of claim 11, wherein each first polar particle has a weight less than a weight of each second polar particle.

16. The device of claim 10, wherein the array substrate comprises a first base substrate, a pixel electrode disposed on the first base substrate, and an organic reflective layer disposed on the pixel electrode that exposes a portion of the pixel electrode to define the capturing holes, and the opposite substrate comprises a second base substrate and a common electrode disposed on a surface of the second base substrate facing the first base substrate.

17. An electrophoretic display device, comprising:
an array substrate that includes a plurality of pixels;
an opposite substrate that faces the array substrate; and
an electrophoretic layer disposed between the array substrate and the opposite substrate, the electrophoretic layer including a non-polar solvent and at least two types of polar particles dispersed therein that display different colors, wherein a first type of polar particles have a greater electric-field-induced mobility than a second type of polar particles, wherein when a first electric field is applied between the array substrate and the opposite substrate, the first type of polar particles cover the opposite substrate wherein a corresponding pixel of the electrophoretic display device displays black, wherein one of the array substrate and the opposite substrate includes a plurality of capturing holes, and each of the capturing holes is configured to capture the at least two types of polar particles when a second electric field is applied between the array substrate and the opposite substrate.

18. The device of claim 17, wherein when the second electric field is applied, the first type of polar particles fill a lower portion of the capturing holes and the second type of polar particles fill an upper portion of the capturing holes not occupied by the first type of polar particles wherein a corresponding pixel of the electrophoretic display device displays white.

19. The device of claim 17, wherein the array substrate comprises a first base substrate, a pixel electrode disposed on the first base substrate, and an organic reflective layer disposed on the pixel electrode that exposes a portion of the pixel electrode to define the capturing holes, and the opposite substrate comprises a second base substrate and a common electrode disposed on a surface of the second base substrate facing the first base substrate.

* * * * *